United States Patent
Kim et al.

(10) Patent No.: US 8,463,046 B2
(45) Date of Patent: Jun. 11, 2013

(54) BETA-SHAPE: COMPACT STRUCTURE FOR TOPOLOGY AMONG SPHERES DEFINING BLENDING SURFACE OF SPHERE SET AND METHOD OF CONSTRUCTING SAME

(75) Inventors: Deok-Soo Kim, Seoul (KR); Donguk Kim, Seoul (KR); Cheol-Hyung Cho, Gyeonggi-do (KR); Joonghyun Ryu, Seoul (KR); Jeongyeon Seo, Seoul (KR); Youngsong Cho, Seoul (KR)

(73) Assignee: IUCF-HYU (Industry-University Cooperation Foundation Hanyang University), Seoul (KR)

( * ) Notice: Subject to any disclaimer, the term of this patent is extended or adjusted under 35 U.S.C. 154(b) by 1415 days.

(21) Appl. No.: 11/993,543

(22) PCT Filed: Jun. 22, 2006

(86) PCT No.: PCT/KR2006/002424
§ 371 (c)(1),
(2), (4) Date: Dec. 21, 2007

(87) PCT Pub. No.: WO2006/137710
PCT Pub. Date: Dec. 28, 2006

(65) Prior Publication Data
US 2010/0183226 A1    Jul. 22, 2010

Related U.S. Application Data

(60) Provisional application No. 60/692,790, filed on Jun. 22, 2005.

(51) Int. Cl.
*G06K 9/46* (2006.01)
*G06T 17/20* (2006.01)

(52) U.S. Cl.
USPC ............................................ 382/195; 345/423

(58) Field of Classification Search
USPC ............................................ 382/195; 345/423
See application file for complete search history.

(56) References Cited

U.S. PATENT DOCUMENTS

| | | | |
|---|---|---|---|
| 6,119,069 A | 9/2000 | McCauley et al. | |
| 6,178,539 B1 | 1/2001 | Papadopoulou | |
| 6,384,826 B1 | 5/2002 | Bern et al. | |
| 2003/0083117 A1 | 5/2003 | Rupert et al. | |
| 2005/0248567 A1* | 11/2005 | Kim | 345/419 |

FOREIGN PATENT DOCUMENTS

KR    10-2003-0018160    3/2003

* cited by examiner

*Primary Examiner* — Claire X Wang
*Assistant Examiner* — Michael Vanchy, Jr.
(74) *Attorney, Agent, or Firm* — Seed IP Law Group PLLC

(57) ABSTRACT

There is provided a beta-shape, which is a compact structure for topology among spheres defining a blending surface of a sphere set. There is also provided a method of constructing the beta-shape, comprising: acquiring a Voronoi diagram of spheres; searching for partially accessible Voronoi edges; and obtaining faces of the beta-shape from the partially accessible Voronoi edges. Further, there is provided a method of utilizing the beta-shape to recognize pockets, which comprises the steps of acquiring the beta-shapes, and recognizing the pockets from the beta-shapes.

24 Claims, 14 Drawing Sheets

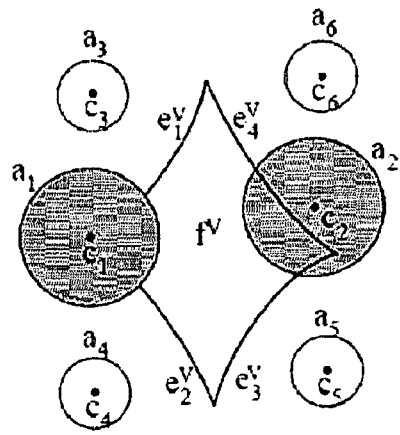
Fig. 30
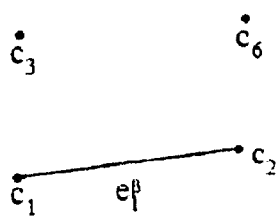
Fig. 31
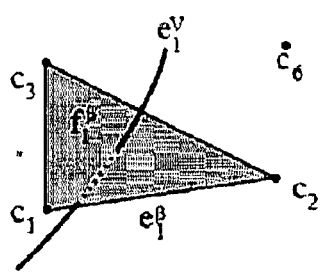
Fig. 32

US 8,463,046 B2

BETA-SHAPE: COMPACT STRUCTURE FOR TOPOLOGY AMONG SPHERES DEFINING BLENDING SURFACE OF SPHERE SET AND METHOD OF CONSTRUCTING SAME

CROSS REFERENCE TO RELATED APPLICATIONS

This application is a U.S. national stage application filed under 35 U.S.C. §371 of International Patent Application PCT/KR2006/002424, accorded an international filing date of Jun. 22, 2006, which claims benefit under 35 U.S.C. 119(e) of U.S. Provisional Patent Application Ser. No. 60/692,790, filed Jun. 22, 2005," both of which are incorporated herein by reference in their entirety.

TECHNICAL FIELD

The present invention relates to a compact structure for topology among spheres, and more particularly a compact structure for topology among spheres defining a blending surface of a sphere set and a method of constructing the same.

BACKGROUND ART

The Voronoi diagram and its related concepts have been quite popular in various technical fields such as science and engineering fields. In particular, the use of Voronoi diagram for a point set has been increasing over the last few years with respect to various applications. This can be attributed to a greater understanding of its mathematical and computational properties, as well as the development of dynamic and efficient codes.

In biology, for example, the Voronoi diagram for the centers of atoms in a molecule was first used by Richards in 1974 to study the packing density of molecules (see F. M. Richards, The interpretation of protein structures: Total volume, group volume distributions and packing density, Journal of Molecular Biology 82 (1974) 1-14). Since then the Voronoi diagram has been used as one of the most important computational tools for conducting structure analysis of molecules.

Since 1974, the Voronoi diagram of a point set has been used quite extensively in the solution processes of various structural biological problems. However, Richards realized that the ordinary Voronoi diagram of points cannot adequately account for the size variations among atoms. As such, Richards proposed to translate the planar bisector between two atoms in the Voronoi diagram according to the size differences between two atoms. However, the translations of bisectors caused the so-called "vertex error" since this transformation cannot generally guarantee a correct tessellation of the space. In 1982, Gellatly and Finney proposed using a radical plane as the bisector between two atoms since such planes can guarantee that vertex errors will not occur (see B. J. Gellatly, J. L. Finney, Calculation of protein volumes: An alternative to the Voronoi procedure, Journal of Molecular Biology 161 (2) (1982) 305-322). While reflecting the size variations among atoms at a certain level, this transformation can guarantee a valid tessellation of the space. The tessellation using radical planes is indeed identical to the power diagram named by Aurenhammer (see F. Aurenhammer, Power diagrams: Properties, algorithms and applications, SIAM Journal on Computing 16 (1987) 78-96).

By introducing the concept of alpha-shapes in 1994, Edelsbrunner and Muecke provided a basis for applying the Voronoi diagram of a point set in reconstructing the shape from which the point set can be produced (see H. Edelsbrunner, E. P. Muecke, Three-dimensional alpha shapes, ACM Transactions on Graphics 13 (1) (1994) 43-72). They also provided an efficient code to compute alpha-shapes using the properties of Delaunay triangulation. Since alpha-shapes are fundamentally based on the rigorous theory of the Voronoi diagram for a point set and the Delaunay triangulation, they have been used in various applications. The main applications of alpha-shapes lie in deriving the surface shape, which is defined by a point set. Based on this property, many researchers have tried to use alpha-shapes for restructuring and deriving the spatial structures of biological systems.

However, alpha-shapes have limitations in their applications in biological systems mainly due to the fact that alpha-shapes can not account for the size variations among atoms. In general, the proximity among spheres is not necessarily identical to the proximity among centers of spheres.

The three-dimensional alpha-shape will be briefly reviewed with reference to FIGS. 1 to 4. Assuming that S is a finite set of points 102 in $R^3$ and a satisfies $0 \leq \alpha \leq \infty$, alpha-hulls and alpha-shapes can be clearly explained as follows:

$R^3$ filled with Styrofoam and the points 102 of S made of a more solid material (e.g., such as rock). Also, there is a spherical eraser 104 with radius $\alpha$. It is omnipresent in the sense that it carves out Styrofoam at all positions where it does not enclose any of the sprinkled rocks, that is, points 102 of S. The resulting object 106 is referred to as the alpha-hull. To make things more feasible, the surface of the object is straightened by substituting straight edges 108 for the circular ones 110 and triangles for the spherical caps. The obtained object 112 is the alpha-shape of S.

Therefore, an alpha-shape 112 is identical to the convex hull of S when $\alpha=\infty$. For $\alpha=0$, the alpha-shape 112 reduces to the point set S itself. Generally, alpha-shapes can be concave and disconnected. Alpha-shapes can contain two-dimensional patches of triangles and one-dimensional strings of edges. Its components can even be points. An alpha-shape 112 is a subset of the closure of the Delaunay triangulation of S, and it may have handles and interior voids.

$\partial X$, $i(X)$ and $cl(X)$ denote the boundary, the interior and the closure of a set X, respectively. In addition, $H_\alpha(S)$ and $S_\alpha(S)$ denote an alpha-hull 106 and an alpha-shape 112 of the set S, respectively. Given the above, it can be generally shown that $\partial I(S_\alpha(S)) \neq \partial S_\alpha(S)$. This implies that alpha-shapes 112 are generally non-manifold.

FIG. 1 shows a point set in the plane and an alpha-hull 106 defined on the point set for a particular value of $\alpha_1$. The corresponding alpha-shape 112 for $\alpha_1$ is shown in FIG. 2 with a dangling edge 114. Similarly, FIGS. 3 and 4 illustrate the alpha-hull 106 and alpha-shape 112 of the same input points 102 for $\alpha_2$ where $0<\alpha_1<\alpha_2$. It should be noted herein that the basic idea of alpha-shape presented in the above applies to higher dimensions as well.

Although the theory of alpha-shape has been applied to many situations, there are some critical instances where the application of this construct is not suitable. For such situations, a pocket recognition will be described hereinafter with reference to FIGS. 5 to 7.

First, we will present the definition of a pocket on the surface of a protein in the geometric point of view. At most, most proteins consist of six different types of atoms, i.e., H, C, N, O, P and S, which have the corresponding Van Der Waals radii of 1.2, 1.7, 1.55, 1.52, 1.8 and 1.8 Å, respectively. These atoms with Van Der Waals radii are usually referred to as Van Der Waals atoms. The number of atoms for a protein varies from hundreds to hundreds of thousands.

In most studies conducted to analyze geometric characteristics of a protein with respect to another molecule (usually relatively small) referred to as a ligand, such analysis is typically done using the concept of a spherical probe which encloses the ligand. While a probe is an approximation of the ligand, the probe can best represent the ligand by incorporating its shape, conformation changes, and all possible orientations of the ligand with respect to the protein. Hence, it is considered that the behavior of a probe best represents the geometric behavior of the ligand with respect to a protein. In the case of a water molecule, the corresponding probe is a sphere with the radius of 1.4 Å.

FIG. 5 illustrates has circles 202 (atoms in the plane) of different radii centered at the black dots 204. In this figure, there is a depressed region 206 (referred to as the pocket) on the surface of the given atomic complex and a black circle 208 in the free-space. The black circle 208 is referred to as a beta-ball with radius $\beta$. FIG. 5 shows that the beta-ball 208 cannot enter the pocket 206 since the distance between the two larger atoms $a_1$ and $a_r$ is not large enough for the beta-ball 208 to pass through.

The method of determining whether or not a beta-ball 208 can freely enter into the pocket 206 or not is discussed below. Ignoring the size differences among the atoms 202 and considering the atom centers 204 only, the best approach for the systematic reasoning of spatial structure may be to use the ordinary Voronoi diagram of the atom centers 204 or the power diagram of atoms. FIG. 6 shows the Voronoi diagram 210 of atom centers 204 and its Delaunay triangulation 212, which is the dual of the Voronoi diagram 210. After enlarging a beta-ball 208 by an appropriate amount to form a beta'-ball 216, the substructure on the protein, which the beta'-ball 208 may pass through, can be detected.

However, the decision of whether the beta-ball 208 can or cannot pass through may not be correct unless the size variation among atoms 202 is properly accounted for. For example, in FIG. 5, the atoms $a_1$ and $a_r$ at the entrance are the largest among all atoms 202 in the molecular system. For example, if the beta-ball 208 is enlarged to a beta'-ball 216 by the average of the all atoms 202 in the system, the depressed region 206 can be recognized as being accessible by the beta-ball 208 (shown in FIG. 7). The solid edges 214 in FIG. 7 show the alpha-shape extracted from the Delaunay triangulation 212 in FIG. 6 by removing the Delaunay edges, which the beta-ball 208 can freely pass through. If the beta-ball 208 is enlarged to a beta'-ball by using the largest atom of the system, then a false pocket will not occur in the above-shown example. However, the opposite error can occur in some cases. Assuming that a valid pocket exists where the entrance of the pocket is composed of smaller atoms than other atoms in the molecular system, if the beta-ball is enlarged to a beta-ball by using the largest atom of the system, then the valid pocket cannot be properly recognized in this case. Thus, regardless of the amount of enlargement, there is always the possibility of misjudgment unless the size variation of atoms is fully incorporated. Hence, a combinatorial search is necessary with an alpha-shape to acquire a correct solution and the search is not necessarily local.

Since the ordinary Voronoi diagram of point set (hence the corresponding Delaunay triangulation) does not properly deliver the proximity information among atoms, applications requiring precise proximity information cannot efficiently yield accurate results.

In order to incorporate the size difference among atoms, Edelsbrunner extended the alpha-shape to the weighted alpha-shape using the regular triangulation, which is the topological dual of the power diagram of the atoms (see H. Edelsbrunner, Weighted alpha shapes, Technical Report UIUCDCS-R-92-1760, Department of Computer Science, University of Illinois at Urbana-Champaign, Urbana, Ill. (1992); and H. Edelsbrunner, The union of balls and its dual shape, Discrete & Computational Geometry 13 (1995) 415-440). Since then, the weighted alpha-shapes have been used in restructuring and reasoning of the spatial structure for molecular systems. However, it should be noted that the distance metric in a power diagram is the power distance. In other words, the radius of the spherical eraser is smaller than the minimum tangential distance between the atoms defining an edge or a face. Then, the eraser is considered small enough to pass through between these atoms without a collision and the corresponding edge or face is considered larger than the eraser. As such, it is always necessary in the weighted alpha-shape to check if the minimum Euclidean distance between the atoms defining a bisector in a power diagram really allows for a spherical probe with a predefined size to freely pass through without a collision. Particularly, the power diagram (and therefore the weighted alpha-shape) cannot correctly provide the proximity information among atoms in the Euclidean distance metric, if such atoms do not intersect. Since the power diagram correctly recognizes the intersections between atoms, if the sizes of atoms are properly adjusted, the power diagram of the adjusted atoms may produce correct results. However, the adjustment of atom sizes depends on the particular application. Hence, different applications may require different size adjustments and the computation of power diagram. Besides the computational inefficiency of using power diagram, it is not clear if the size adjustment can be nicely defined for a particular application. Thus, weighted alpha-shapes themselves also have deficiencies in biological applications based on Euclidean distance metric even though they reflect the size variations of atoms at a certain level.

DISCLOSURE OF INVENTION

Technical Problem

The main pitfall of alpha-shape and weighted alpha-shape lies in the fact that they have deficiencies to fully account for the size variation of input geometry efficiently.

Technical Solution

It is, therefore, an object of the present invention to provide a compact structure for topology among spheres defining a blending surface of a sphere set. It is another object of the present invention to provide a method for constructing such structure from the sphere set. It is yet another object of the present invention to provide a method utilizing the above structure.

According to one aspect of the present invention, there is provided a computer-readable medium, which comprises the following: computer-readable code adapted to obtain a Voronoi diagram object of spheres; computer-readable code adapted to search for partially accessible Voronoi edges from the Voronoi diagram object; and computer-readable code adapted to compute faces of a beta-shape object from the partially accessible Voronoi edges.

According to another aspect of the present invention, there is provided a computer-readable medium, which comprises the following: computer-readable code adapted to obtain beta-shape objects; and computer-readable code adapted to recognize pockets from the beta-shape objects.

According to yet another aspect of the present invention, there is provided a system, which comprises the following: logic configured to obtain a Voronoi diagram object of spheres; logic configured to search for partially accessible Voronoi edges from the Voronoi diagram object; and logic configured to compute faces of a beta-shape object from the partially accessible Voronoi edges.

According to still yet another aspect of the present invention, there is provided a system, which comprises the following: logic configured to obtain beta-shape objects; and logic configured to recognize pockets from the beta-shape objects.

According to a further aspect of the present invention, there is provided a method of constructing a beta-shape, which comprises the following steps: acquiring a Voronoi diagram of spheres; searching for partially accessible Voronoi edges; and obtaining faces of the beta-shape from the partially accessible Voronoi edges.

According to yet another aspect of the present invention, there is provided a method of recognizing pockets, which comprises the following steps: acquiring beta-shapes; and recognizing pockets from the beta-shapes.

Advantageous Effects

The present invention introduces a concept of beta-shape, which is based on Euclidean distance metric and considers the size differences among circles and spheres. Further, the present invention provides an efficient method of constructing the beta-shape. The present invention also provides a geometric method for pocket recognition based on the beta-shape and Voronoi diagram for atoms in the Euclidean distance metric.

BRIEF DESCRIPTION OF THE DRAWINGS

The above and other objects and features in accordance with the present invention will become apparent from the following descriptions of preferred embodiments given in conjunction with the accompanying drawings, in which:

FIGS. 30 to 33 show searching beta-shape faces from Voronoi face in accordance with the fifth preferred embodiment of the present invention;

BEST MODE FOR CARRYING OUT THE INVENTION

Numerous specific details are set forth below in order to provide a thorough understanding of the present invention. It will be apparent, however, to one skilled in the art, that the present invention may be practiced without some or all of these specific details. Further, it should be noted herein that well-known process steps have not been described in detail so as not to unnecessarily obscure the present invention.

To incorporate the size differences of atoms into the concept of alpha-shapes, one aspect of the present invention provides the concept of beta-shapes. The beta-shape is a compact structure for topology among spheres defining a blending surface of a sphere set. In view of FIGS. 8 to 11, the concept of beta-hulls will first be introduced and then beta-shapes, which are in accordance with a first preferred embodiment of the present invention, will be described.

Conceptually, a beta-hull is a generalization of an alpha-hull and can be similarly described. The point set from which an alpha-hull is defined is now replaced by a set of three-dimensional spherical balls. In the case of alpha-hulls, assume $R^3$ filled with Styrofoam and some spherical rocks scattered around the inside of the Styrofoam. The radii of the spherical rocks are different. Then, carving out the Styrofoam with an omnipresent and empty spherical eraser with the radius of $\beta$ will result in a beta-hull. Since the eraser is omnipresent, there can be interior voids as well.

Figure 8:
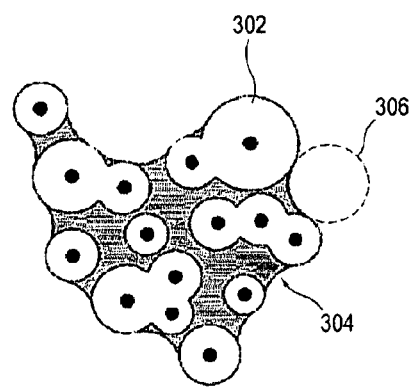
FIGS. 8 to 11 illustrate beta-hulls and beta-shapes of a 2-dimensional atom set in accordance with a first preferred embodiment of the present invention.
Figure 9:
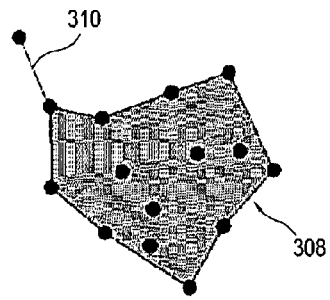
Figure 10:
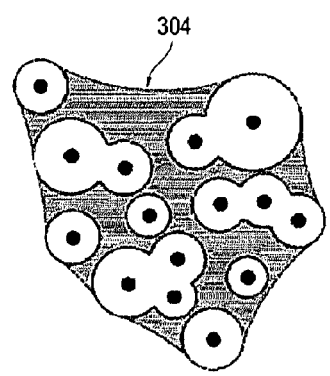
Figure 11:
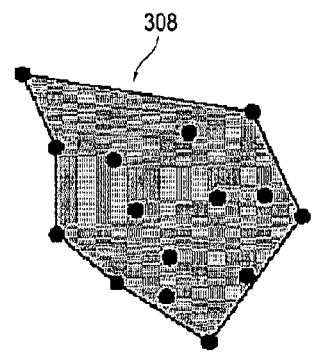

In FIG. 8, there are a set of 2-dimensional atoms 302 and a beta-hull 304 for the atom set corresponding to a beta-ball 306 with a particular radius value of $\beta_1$. The corresponding beta-shape 308 is shown in FIG. 9. It should be noted that there is a dangling edge 310 on the beta-shape 308. FIGS. 10 and 11 illustrate another beta-hull 304 and beta-shape 308 for the same atom set defined by $\beta_2$ where $0<\beta_1<\beta_2$.

Consider $A=\{a_i|i=1,\ldots,n\}$ as a finite set of three-dimensional spherical rocks. For $0<\beta\leq\infty$, a beta-ball b is an open ball with a radius $\beta$. The beta-ball b with $\beta=0$ generally corresponds to a point. It should be noted that $\beta=\infty$ corresponds to an open half-space. The beta-hall b is called empty if and only if $b\cap A=\emptyset$.

For $0\leq\beta\leq\infty$, the beta-hull of A, which is denoted by $H_\beta(A)$, is defined as the complement of the union of all empty beta-balls. If $\beta=\infty$, then $H_\beta(A)$ is the convex hull of A. If $\beta=0$, then $H_\beta(A)$ is A itself. In fact, the boundary of the beta-hull for set A, which is denoted by $\partial H_\beta(A)$, is the molecular surface of A.

Given an alpha-hull, an alpha-shape is obtained by straightening the curved geometry in the corresponding alpha-hull. In other words, circular arcs and spherical caps of alpha-hulls are replaced by line segments and triangles. A beta-shape can be similarly explained with a slight but yet fundamental difference. In the beta-family, therefore, the relationship between a beta-hull and the corresponding beta-shape is slightly different from their counterparts in the alpha-family.

Assuming that a beta-hull $H_\beta(A)$ for an atomic structure A is given, the boundary $\partial b$ of an empty beta-ball b may or may not touch one or more atoms in the set A. Also, it should be assumed that $A_{sub}(b)$ is a subset of A consisting of atoms, which are simultaneously touched by the boundary of an empty beta-ball b.

Then, the beta-shape $S_\beta(A)$, which corresponds to $H_\beta(A)$, is obtained by connecting the centers of the appropriate atoms, as follows: if $|A_{sub}(b)|=1$, then the center of the touched atom becomes a vertex in $S_\beta(A)$; if $|A_{sub}(b)|=2$, then the edge defined between the centers of the two touched atoms becomes an edge in $S_\beta(A)$; and if $|A_{sub}(b)|=3$, then the triangle defined among the centers of the three touched atoms becomes a face in $S_\beta(A)$. A formal definition of a beta-shape is as follows.

Assume that $A_{sub}(b)=\{a \in A | b \cap A = \emptyset, a \cap \partial b \neq \emptyset\}$ and $C_{sub}(b)=\{c | a=(c, r) \in A_{sub}(b)\}$, wherein c and r are the center and radius of an atom a, respectively. Further assume that $\Delta_b$ is the convex combination of elements in $C_{sub}(b)$ for a particular b. Then, the beta-shape $S_\beta(A)$ of A is a polytope bounded by a set $\cup \Delta_b$, for all possible b in the space corresponding to a particular value of $\beta$, $0 \leq \beta \leq \infty$.

It should be emphasized herein that a beta-shape is a polytope, which has both an interior and a boundary. It should be also noted that $1 \leq |A_{sub}(b)| \leq 3$ if the atoms in A are all located in general position. In other words, it is assumed that $\partial b$ for an empty beta-ball b can simultaneously touch either one, two or three atoms. This argument can be generalized to the d-dimension as well.

Assume that a beta-shape $S_\beta(A)$ is represented as sets of vertices, edges and faces. In other words, $S_\beta(A)=(V^\beta, E^\beta, F^\beta)$ where $V^\beta=\{v^\beta_1, v^\beta_2, \ldots\}$, $E^\beta=\{e^\beta_1, e^\beta_2, \ldots\}$ and $F^\beta=\{f^\beta_1, f^\beta_2, \ldots\}$ are sets of vertices, edges, and faces of $S_\beta(A)$, respectively. It should be noted that $v^\beta_i \in V^\beta$ corresponds to the center $c_i$ of an atom $a_i \in A$. As such, the following properly can be derived.

Assume that b represents an empty beta-ball. If b touches an atom $a_i \in A$, then the center $c_i$ of $a_i$ maps to a vertex $v^\beta_i \in V^\beta$. If b simultaneously touches two atoms $a_i$ and $a_j$, then their centers $c_i$ and $c_j$ define an edge $e^\beta_{ij} \in E^\beta$. If b simultaneously touches three atoms $a_i$, $a_j$ and $a_k$, then the convex combination of their centers $c_i$, $c_j$ and $c_k$ define a triangular face $f^\beta_{ijk} \in F^\beta$.

$\partial H_\beta(A)$ corresponds to a blended model of A with a probe of radius $\beta$. There are two types of blending surface in $H_\beta(A)$: a rolling blend and a link blend. A rolling blend $\rho$ is defined between two nearby or adjacent atoms by rolling the probe around the line passing through the atom centers while keeping tangential contacts with such atoms. When the probe touches a third atom, the rolling blend ceases to exist. Instead, a link blend $\lambda$ is defined among three neighboring atoms by placing the probe on top of the three atoms.

Assume that two atoms $a_i$ and $a_j$ are in close proximity to each other so that they define a rolling blend $\rho_{ij}$. Then, an edge $e^\beta_{ij}$ between the centers $c_i$ and $c_j$ of the atoms $a_i$ and $a_j$ can be defined. If this operation is applied for all such pairs of atoms, then the definitions of $E^\beta$ for the beta-shape $S_\beta(A)$ can be obtained. Assume that a triplet of atoms $a_i$, $a_j$ and $a_k$ defines a link blend $\lambda_{ijk}$. Then, a triangular face $f^\beta_{ijk}$ using $v^\beta_i$, $v^\beta_j$, and $v^\beta_k$ as the vertices can be defined. If this operation is applied for all such triplets of atoms, the definition of $F^\beta$ can be obtained.

Assume that a rolling blend $\rho_{ij}$ is defined between two atoms $a_i$ and $a_j$ and the swept-volume of the probe along the spine of the sweeping does not intersect with any other atoms. Then, the spine curve of the rolling blend $\rho_{ij}$ is a complete circle. In such a case, the corresponding edge $e^\beta_{ij}$ does not contribute to any face $f^\beta \in F^\beta$. Thus, it is considered as a dangling edge. Similarly, there can be dangling faces as well.

$S_\beta(A)$ is referred to as a beta-shape since the construct is defined based on the concept of blending over all atoms in A. It should be noted that the actual operation of blending should not be explicitly performed at all. The existence of such blending patches on the surface of the atomic complex is only checked by referring to the appropriate Voronoi edges and faces. The name, beta-shape, also implies that it is a generalization of a well-known alpha-shape by fully taking into account the size differences among atoms.

Figure 1:
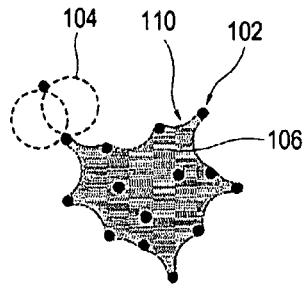
FIGS. 1 to 4 illustrate alpha-hulls and alpha-shapes of an identical point set in the plane.
Figure 2:
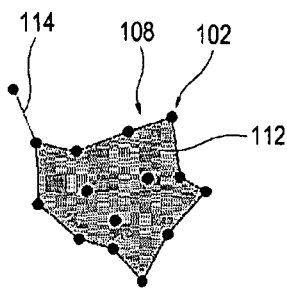
Figure 3:
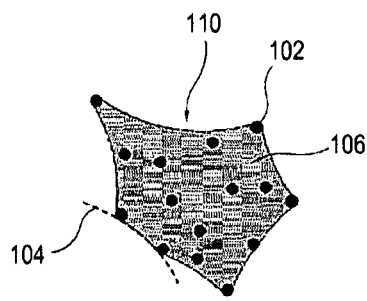
Figure 4:
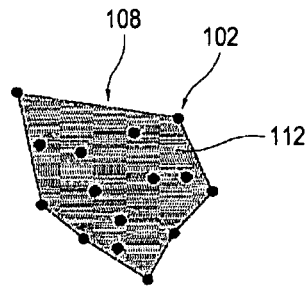
Figure 5:
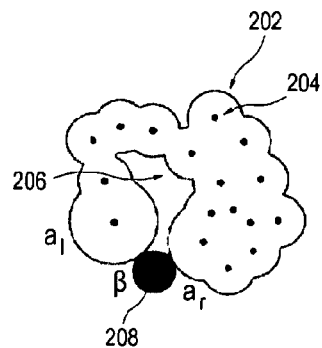
FIGS. 5 to 7 show a false pocket recognized from the alpha-shape of an atom set.
Figure 6:
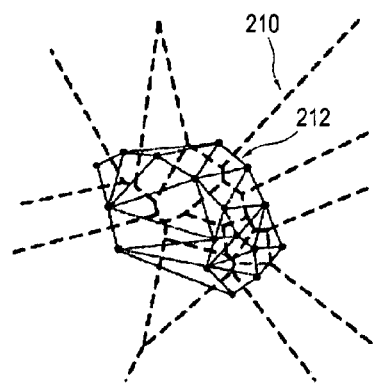
Figure 7:
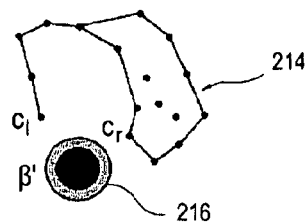
Figure 12:
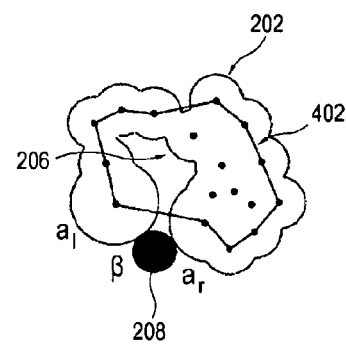
FIG. 12 shows a closed false pocket in the beta-shape shown as a polygon, wherein the atom set and the probe are identical to those in FIG. 5.

FIG. 12 shows the same probe 208 and atom set 202 (shown in FIG. 5) as well as the corresponding beta-shape 402 depicted by a polygon. It should be noted that the false pocket is now closed in the beta-shape 402. Therefore, a correct decision can be made on whether the beta-ball 208 can enter the pocket 206.

Although FIGS. 8 to 11 and FIG. 12 show 2D beta-shapes, the beta-shapes can be constructed for 3D molecular models. A second preferred embodiment related to the 3D beta-shapes will be described hereinafter with reference to FIGS. 13 to 16 and FIGS. 17 to 25.

Figure 13:
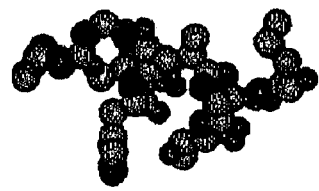
FIGS. 13 to 16 show a set of atoms, Voronoi diagram for the atoms, molecular surface of the atoms and a 3D beta-shape for the atoms in accordance with a second preferred embodiment of the present invention.
Figure 14:
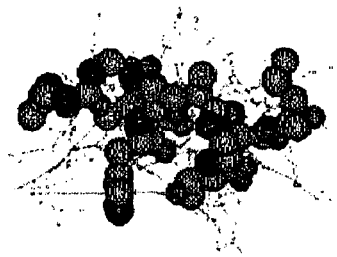
Figure 15:
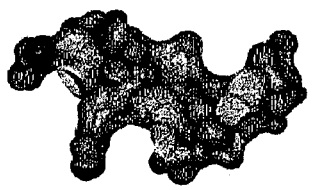
Figure 16:

FIG. 13 shows a subset of a protein downloaded from PDB (Protein Data Bank) and its Voronoi diagram is shown in FIG. 14. The model consists of 67 atoms (41 C's, 14 N's and 12 O's) and forms a secondary structure called an alpha-helix. Typically, the hydrogen atoms are omitted in the protein data in PDB. In FIG. 15, the molecular surface of the molecule using a probe with a radius of 1.4 Å is shown. FIG. 16 shows the beta-shape corresponding to the molecular surface in FIG. 15. It should be emphasized that the computation of the beta-shape does not require the computation of the molecular surface. On the contrary, the computation of the molecular surface can be facilitated if the corresponding beta-shape is available. Note that the Voronoi diagram may be stored as a data structure. For example, the Voronoi diagram may be represented in a non-manifold data structure, such as a radial edge data structure, without being limited thereto (see K. Weiler. The radial edge structure: A topological representation for non-manifold geometric boundary modeling. In Geometric Modeling for CAD Applications, pp. 3-36. North-Holland, 1988; and Youngsong Cho, Donguk Kim, and Deok-Soo Kim, Topology Representation for the Voronoi Diagram of 3D Spheres, International Journal of CAD/CAM, Vol. 5, No. 1, pp. 59-68, 2005).

Figure 17:
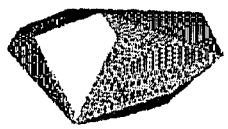
FIGS. 17 to 25 show the beta-shapes computed by different probes from the atomic complex shown in FIG. 13.
Figure 18:
Figure 19:
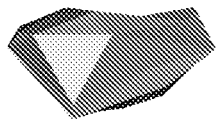
Figure 20:
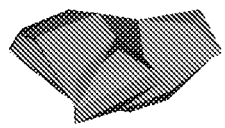
Figure 21:
Figure 22:
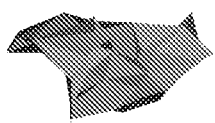
Figure 23:
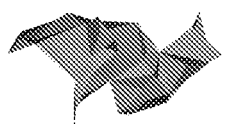
Figure 24:
Figure 25:

FIGS. 17 to 25 show different beta-shapes computed by different probes from the identical atomic complex shown in FIG. 13. FIG. 17 is a beta-shape corresponding to a probe with a radius of infinity, i.e., $\beta=\infty$. It should be noted that this beta-shape is identical to the convex hull of the centers of all atoms in the complex. However, it should be also noted that this property does not necessarily hold in general. On the other hand, FIG. 25 is the beta-shape when $\beta=0$ Å. FIGS. 18 to 24 show the beta-shapes corresponding to probe sizes of 30, 10, 5, 4, 3, 1.4, and 0.7 Å, respectively. When the probe reduces to a point (i.e., when $\beta=0$), as shown in FIG. 25, the corresponding beta-shape results in a structure consisting of points, edges and/or triangles. Note that the intersection of two atoms transforms to an edge, and the simultaneous intersection among three atoms transforms to a triangle when $\beta=0$ Å. When an atom is located far away from the other atomic complex, it can even be reduced to an isolated point.

Figure 26:
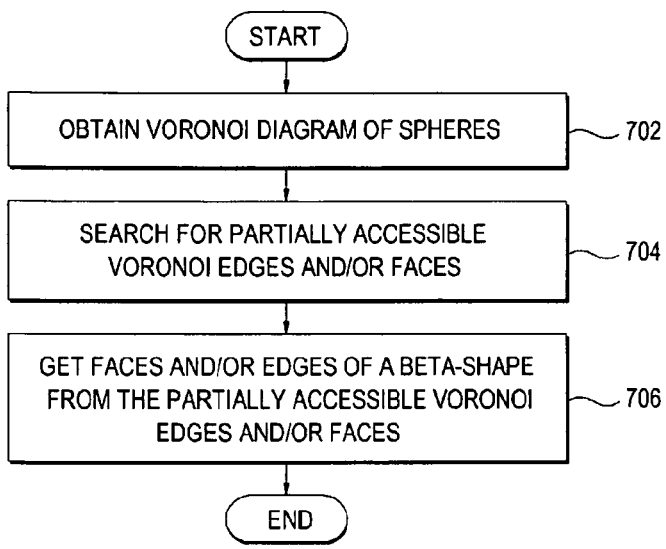
FIG. 26 shows a method of constructing a beta-shape from a Voronoi diagram of spheres in accordance with a third preferred embodiment of the present invention.

Hereinafter, with reference to FIG. 26, a method of constructing a beta-shape from a Voronoi diagram of spheres, which is in accordance with a third preferred embodiment of the present invention, will be described. The method constructs a beta-shape with a correct topology connection. As the alpha-shape is computed from the Delaunay triangulation of a point set, the beta-shape of an atom set is computed from the Voronoi diagram of atoms.

A Voronoi diagram VD(A) for an atom set A is defined as follows. Associated with each atom $a_i \in A$, there is a corresponding Voronoi region $VR_i$ for $a_i$, wherein $VR_i = \{p | dist(p, c_i) - r_i \leq dist(p, c_j) - r_j, i \neq j\}$ and dist(p,q) denotes a Euclidean distance between points p and q. Then, $VD(A) = \{VR_1, VR_2, \ldots, VR_n\}$ is the Voronoi diagram for the given atoms and represented as $G^v = (V^v, E^v, F^v)$, wherein $V^v = \{v^v_1, v^v_2, \ldots\}$, $E^v = \{e^v_1, e^v_2, \ldots\}$ and $F^v = \{f^v_1, f^v_2, \ldots\}$ are sets of Voronoi vertices, edges and faces, respectively. It is important that the topological adjacencies among vertices, edges and faces should be also appropriately represented in the Voronoi diagram. From the definition of a Voronoi diagram, a Voronoi vertex $v^v$ is the center of an empty sphere tangent to four nearby atoms, while a Voronoi edge $e^v$ is defined as a locus of points equidistant from the surfaces of three surrounding atoms. In addition, a Voronoi face $f^v$ is the surface defined by two neighboring atoms. Note that the face is always a hyperbolic surface and any point on the face is equidistant from the surfaces of both atoms. As mentioned above, the Voronoi diagram may be stored in a storage as a data structure, which can be handled by a computer or the like.

Since Aurenhammer initially discussed the Voronoi diagram of atoms, a few researchers have studied the algorithm to compute this Voronoi diagram. Recently, as described in U.S. Patent Publication No. 2005/0248567, practical algorithms and their implementations are reported, which will not be described in detail in this specification.

Assume $e^v$ is an edge of VD(A) with a starting and ending Voronoi vertices $v^v_s$ and $v^v_e$, respectively, and $e^v$ is defined by three atoms $a_i$, $a_j$ and $a_k$. It is known that $e^v$ is conic and therefore planar. Assume $D_{eV}(x)$ is the Euclidean distance from a point $x \in e^v$ to the surface of one of the three atoms, and $r_p$ is the radius of a given probe p. Further assume that $D^{min}_{eV}$ and $D^{max}_{eV}$ are the minimum and maximum values of $D_{eV}(x)$, respectively, wherein $x \in e^v$. Then, it can be shown that $D_{eV}(x)$ is unimodal when x moves from $v^V_s$ to $v^V_e$ along the edge $e^v$. Hence, $D^{min}_{eV}$ occurs when either $x \equiv v^v_s$ or $x \equiv v^v_e$, or x is the intersection between $e^V$ and the plane passing through $c_i$, $c_j$ and $c_k$, i.e., the centers of three atoms $a_i$, $a_j$ and $a_k$, respectively. On the other hand, $D^{max}_{eV}$ always occurs at either $x \equiv v^v_s$ or $x \equiv v^v_e$. Note that the distance $D_{eV}(v^v_s)$ and $D_{eV}(v^v_e)$ can be computed while VD(A) is constructed. An edge $e^v$ is defined to be partially accessible by a probe p if $D^{min}_{eV} < r_p \leq D^{max}_{eV}$. Also, the edge $e^v$ is defined to be fully accessible if $r_p \leq D^{min}_{eV}$ and non-accessible if $D^{max}_{eV} < r_p$.

Assume $f^v$ is a face in VD(A) defined by two neighboring atoms $a_i$ and $a_j$, and $D_{fV}(x)$ is the Euclidean distance from a point $x \in f^v$ to the surface of one of the atoms. $D^{min}_{fV}$ and $D^{max}_{fV}$ are also similarly defined as before. A face $f^v$ is defined to be partially accessible by a probe p if $D^{min}_{fV} < r_p \leq D^{max}_{fV}$. The face $f^V$ is defined to be fully accessible if $r_p \leq D^{min}_{fV}$ and non-accessible if $D^{max}_{fV} < r_p$.

Assume that a Voronoi edge $e^V$ is defined by three atoms $a_i$, $a_j$ and $a_k$. If $e^V$ is partially accessible by a probe p, then the three atoms define a link blend $\lambda_{ijk}$ and the corresponding triangular face $f^\beta_{ijk}$ defined by the vertices $c_i$, $c_j$ and $c_k$ is an element of $F^\beta$, wherein $S_\beta(A) = (V^\beta, E^\beta, F^\beta)$ is the beta-shape.

Assume that a Voronoi face $f^v$ is defined by two atoms $a_i$ and $a_j$. If $f^v$ is partially accessible by a probe p, then two atoms define a rolling blend $\rho_{ij}$ and the corresponding edge $e^\beta_{ij}$ defined by the vertices $c_i$ and $c_j$ is an element of $E^\beta$, wherein $S_\beta(A) = (V^\beta, E^\beta, F^\beta)$ is the beta-shape.

Thus, in the present embodiment, the construction of a beta-shape begins by obtaining a Voronoi diagram of spheres in step 702. It then searches for such partially accessible Voronoi edges and/or faces from the obtained Voronoi diagram in step 704. For example, all of the edges and/or faces in VD(A) may be checked with the above properties of the partially accessible edges and/or faces in a brute force way to collect partially accessible Voronois edges and/or faces. Next, in step 706, it obtains faces and/or edges of a beta-shape from the partially accessible Voronoi edges and/or faces, respectively. For example, applying the above properties to the partially accessible edges and/or faces will eventually produce the desired result. That is, the face set $F^\beta$ can be easily identified in $O(|E^v|)$ time in the worst case by scanning all the Voronoi edges in $E^v$ at once by applying the properties.

Figure 27:
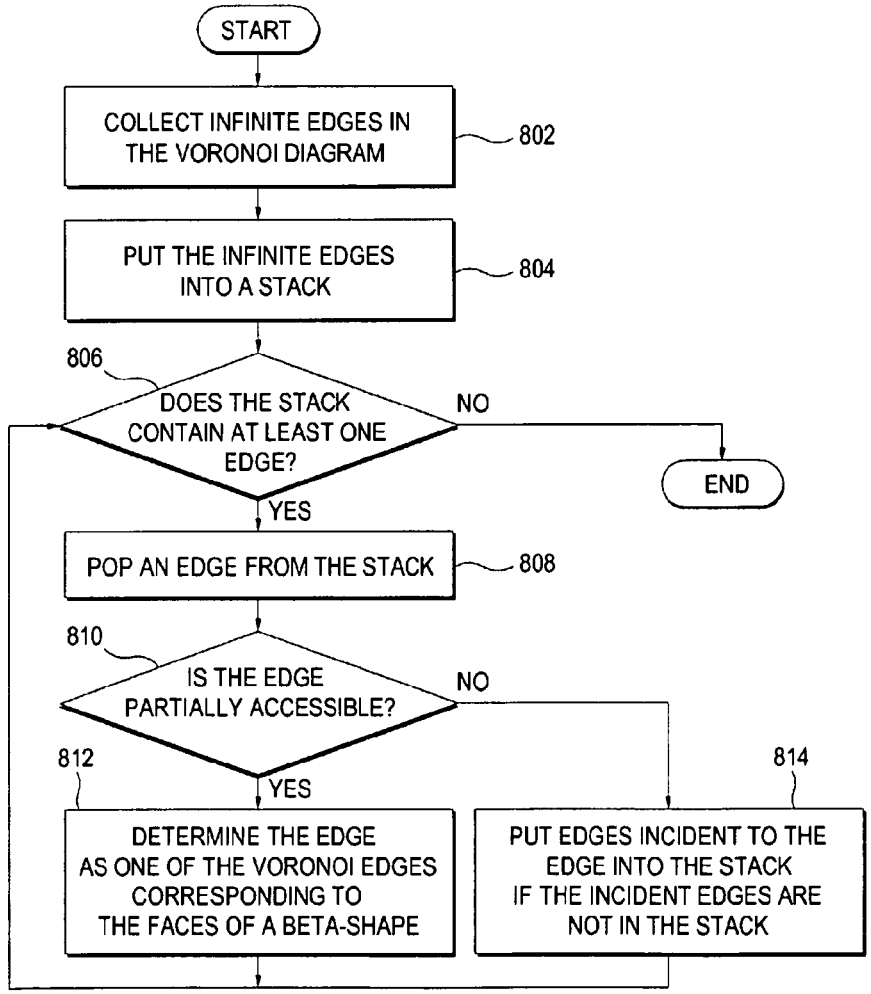
FIG. 27 depicts a part of a method of constructing a beta-shape from a Voronoi diagram of spheres in accordance with a fourth preferred embodiment of the present invention.

Hereinafter, another method of constructing a beta-shape from a Voronoi diagram of spheres, which is in accordance with a fourth preferred embodiment of the present invention, will be described with reference to FIGS. 27 and 28. The steps shown in FIG. 27 may correspond to the step 704 of FIG. 26. The steps produce Voronoi edges corresponding to a subset of the face set $F^\beta$ which constitutes the exterior shell of $S_\beta(A)$, but without any appropriate topology connectivity. Since VD(A) has more than one Voronoi edges emanating to infinity, this method examines the partial accessibility of the Voronoi edges in the VD(A) in a depth-first search starting from an arbitrary infinite Voronoi edge. Hence, the method of the present embodiment does not explore its search for the non-accessible edge set. Therefore, the result may be better than the brute force approach for the full search in the edge set. As long as there is one or more inner shell in $S_\beta(A)$, the method can be easily modified to find all faces in the inner shell.

The method begins by collecting infinite edges in the Voronoi diagram in step 802, and the infinite edges are put into a stack in step 804. It checks whether the stack contains at least one edge in step 806. If the stack does not contain an edge, then the method finishes. If the stack contains at least one edge, it pops an edge from the stack in step 808, and then checks whether the popped edge is partially accessible in step 810. If the popped edge is partially accessible, then it determines the popped edge as one of the Voronoi edges corresponding to the faces of a beta-shape in step 812. Otherwise, if the popped edge is not partially accessible, then it puts edges incident to the popped edge into the stack on the condition that the incident edges are not in the stack in step 814. Then, the process returns back to the step 806, where it is checked whether the stack contains at least one edge.

Even though its time complexity would be identical to the one for the brute force approach, the method of the present embodiment is much faster in practice than the brute force approach since there are significantly fewer partially accessible Voronoi edges than $|E^v|$. Note that $|E^v|$ is O(n) for proteins in the worst case scenario, although it can generally be $O(n^2)$ in the case of arbitrarily sized spheres.

Figure 28:
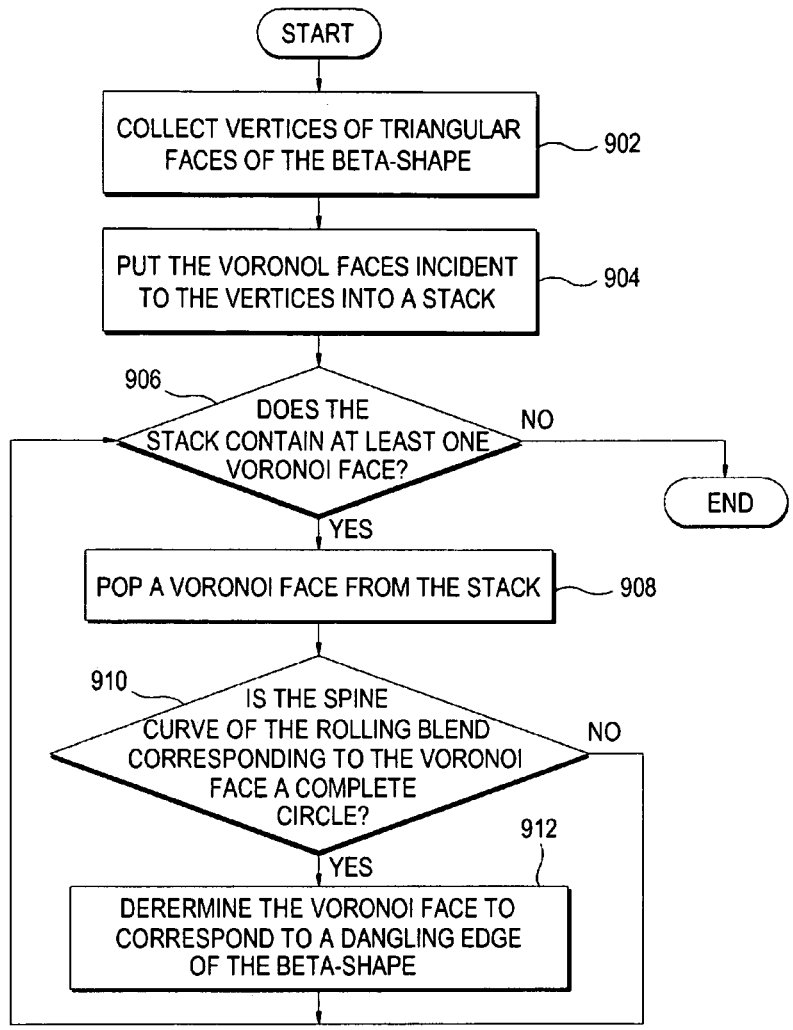
FIG. 28 shows another part of the method in accordance with the fourth preferred embodiment of the present invention.

Similarly, the steps shown in FIG. 28 produce the dangling edges of $S_\beta(A)$. The steps of FIG. 28 begin by collecting the vertices of triangular faces of the beta-shape in step 902. Then, it puts Voronoi faces incident to the vertices into a stack in step 904. After checking whether the stack contains at least one Voronoi face in step 906, it pops a Voronoi face from the stack in step 908. If the stack does not contain any Voronoi face, then the process finishes. After the step 908, it checks whether the spine curve of the rolling blend corresponding to the Voronoi face is a complete circle in step 910. If the spine curve of the rolling blend corresponding to the Voronoi face is a complete circle, then it determines the face as one of the Voronoi faces corresponding to dangling edges of a beta-shape in step 912. Then, it returns back to the step 906.

Figure 29:
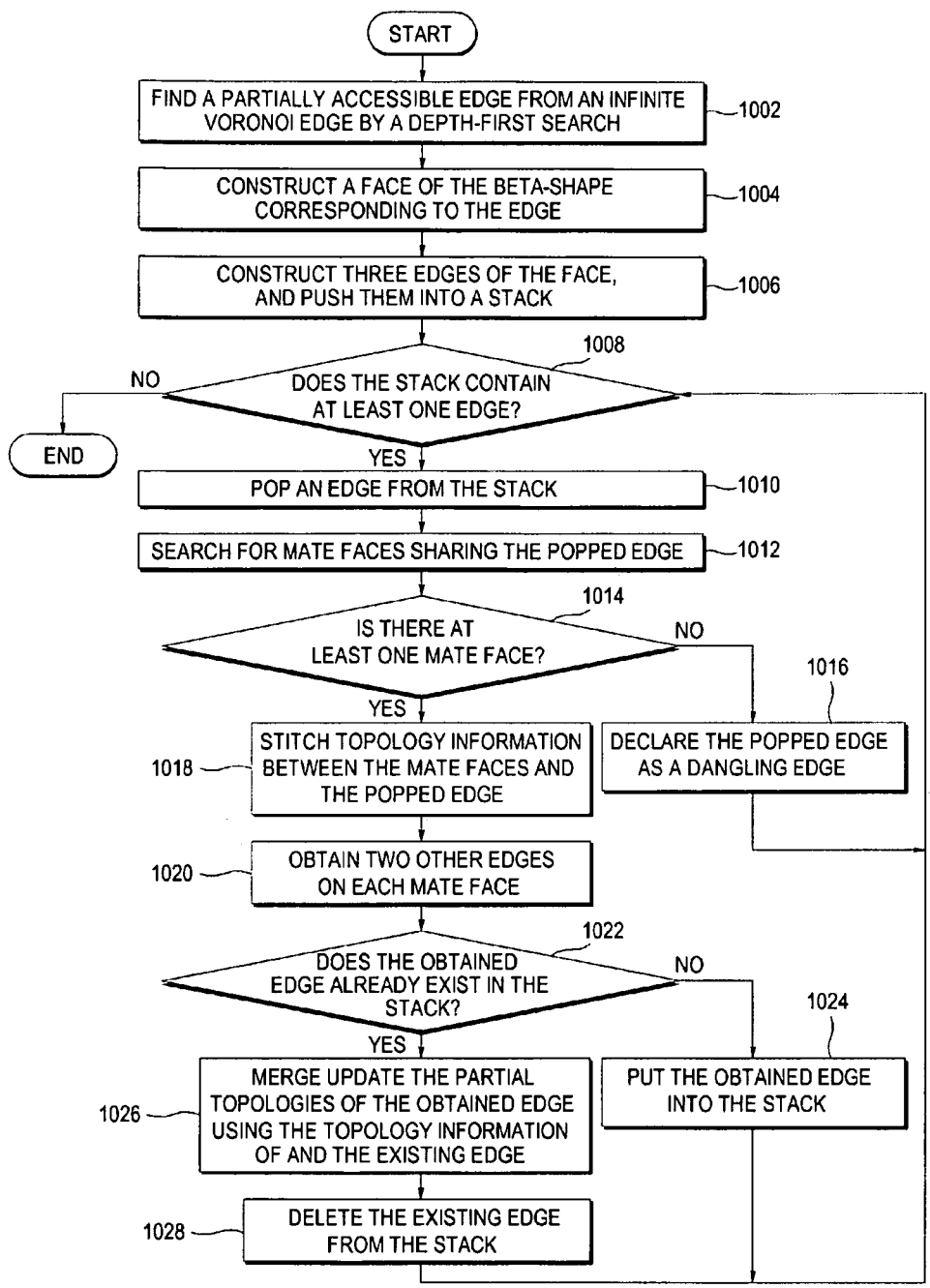
FIG. 29 shows an edge-crossing method in accordance with a fifth preferred embodiment of the present invention.

It should be noted herein that the method of the present embodiment simply locates the faces and edges of the beta-shape $S_\beta(A)$. To complete the topology structure among vertices, edges and faces, it is necessary to perform a file inversion among $V^\beta$, $E^\beta$ and $F^\beta$. The following method in accordance with a fifth preferred embodiment (or an edge-crossing method) combines the steps of FIGS. 27 and 28 and constructs the topology structure. The edge-crossing method, which will be described hereinafter with reference to FIG. 29, is an efficient method to construct a beta-shape.

The edge-crossing method begins by finding a partially accessible edge from an infinite Voronoi edge by a depth-first search in step 1002. It then constructs a face of the beta-shape corresponding to the found edge in step 1004. In step 1006, it constructs three edges of the face, and pushes them into a stack. Then, it checks whether the stack contains at least one edge in step 1008. If the stack does not contain any edge, then the process finishes. However, if the stack contains at least one edge, then it pops an edge from the stack in step 1010, and then searches for mate faces sharing the popped edge in step 1012. It checks whether there is at least one mate face in step 1014. If there is no mate face, then it declares the popped edge as a dangling edge in step 1016, in which case the process returns back to the step 1008. Otherwise, if there is at least one mate face, then it stitches topology information between the mate faces and the popped edge in step 1018. Then, in step 1020, it obtains two other edges on each mate face (except the popped edge). Next, it checks whether the obtained edge already exists in the stack in step 1022. If the obtained edge does not exist in the stack, then it puts the obtained edge into the stack in step 1024. However, if the obtained edge already exists in the stack, then it updates the partial topologies of the obtained edge using the topology information of the existing edge in step 1026 and deletes the existing edge from the stack in 1028. Thereafter, the process returns back to the step 1008.

Note that the edge in the step 1002 can be either an infinite edge or a finite edge. The topology data of an edge $e^\beta_{pop}$ popped from the stack in the step 1010 is only partially defined. To complete the topology associated with $e^\beta_{pop}$, it is necessary to locate faces incident to $e^\beta_{pop}$. If given a face $f^\beta_{old} \in F^\beta$ incident to $e^\beta_{pop}$, then another face $f^\beta_{new} \in F^\beta$ incident to $e^\beta_{pop}$ can be easily located by crossing the edge $e^\beta_{pop}$ starting from $f^\beta_{old}$. $f^\beta_{new}$, which is referred to as a mate face of $f^\beta_{old}$. Hence, such a method is referred to as an edge-crossing method. Note that the edge-crossing can be easily done if VD is represented in a non-manifold data structure, for example, a radial edge data structure. Hence, stitching the connectivity among $f^\beta_{new}$, $f^\beta_{old}$ and $e^\beta_{pop}$ can be done without any difficulty.

FIGS. 30 to 33 illustrate the edge-crossing method of the present embodiment. Assume $f^v$ is a Voronoi face defined by two atoms $a_1$ and $a_2$, as shown in FIG. 30. In the figures, $f^v$ is bounded by four Voronoi edges $e^v_1$, $e^v_2$, $e^v_3$ and $e^v_4$. Assume $e^v_1$ is defined by three atoms $a_1$, $a_2$, and $a_3$. Other Voronoi edges, $e^v_2$, $e^v_3$ and $e^v_4$, are similarly defined. Since the beta-shape $S_\beta(A)$ is generally non-manifold, the step 1012 may produce zero, one, or more than one faces depending on the conditions of the atomic structure and the probe.

Assume that all the edges $e^v_1$, $e^v_2$, $e^v_3$ and $e^v_4$ bounding the Voronoi face $f^v$ are fully accessible while $f^v$ itself is partially accessible. This then means that there can be a complete rolling blend, which is defined between atoms $a_1$ and $a_2$. Thus, in such a case, $f^v$ corresponds to a dangling edge between the centers of $a_1$ and $a_2$ as shown in FIG. 31.

Figure 33:
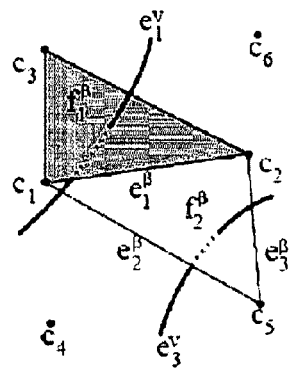

Assume that $e^v_1$ has been tested and it was found that it is partially accessible so that its corresponding beta-shape face $f^\beta_1$ is already found (shown in FIG. 32). If all the edges bounding the Voronoi faces defined among $a_1$, $a_2$, and $a_3$ (except $e^v_1$) are fully accessible, then it can be easily concluded that $f^\beta_1$ is a dangling face. If $e^v_3$ (in addition to $e^v_1$) is partially accessible, then another beta-shape face $f^\beta_2$ is defined as shown in FIG. 33. In such a case, it should be noted that the two edges $e^\beta_2$ and $e^\beta_3$ need to be pushed into the stack after this face is processed for a later exploration.

The edge-crossing method runs in $O(E^v)$ time in the worst case. Note, however, that the number of surface atoms is usually much less than the total number of atoms in the system. Although the methods provided by the present invention are all designed to handle only the outer shell for the beta-shape of a single component, it should be recognized that the methods can be easily modified to appropriately account for the situations in that the beta-shape contains more than one components and/or has inner shells corresponding to the interior voids. While the edge-crossing method of the present embodiment assumes the existence of some partially accessible edges, the other case can also be handled via a slight variation in the presented method.

The beta-shape may be stored in a storage as a data structure, which can be handled by a computer or the like. For example, the beta-shape may be stored as a graph consisting of faces, edges and vertices. Thus, it should be recognized that the methods of the present invention may be implemented as computer-readable codes, which can be stored in a computer-readable medium and utilized via the use of a computer or the like. Furthermore, the methods of the present invention may be easily practiced with a system.

For example, the edge-crossing method may be implemented as following:

Input: VD(A), a probe p
Output: beta-shape $S_\beta(A)$ with topology
Step 1. (Preprocessing)
Step 1.1. Find a partially accessible edge $e^v$ from an infinite Voronoi edge $e^v_\infty$ by a depth-first search.
Step 2. (Initialization)
Step 2.1. Construct a face $f^\beta_{ijk}$ in $S_\beta(A)$ corresponding to $e^v$ which is defined by three atoms $a_i$, $a_j$ and $a_k$.
Step 2.2. Construct three edges $e^\beta_{ij}$, $e^\beta_{jk}$ and $e^\beta_{ki}$ of $f^\beta_{ijk}$, and push them into a stack T.
Step 3. (Checking the stack T)
Step 3.1. If T is empty, then go to Step 7.
Step 3.2. Else, $e^\beta_{pop}$ <-Pop(T).
Step 4. (Searching for other faces sharing $e^\beta_{pop}$: Edge-crossing)
Step 4.1. Search for all mate faces sharing $e^\beta_{pop}$.
Step 4.2. If there is no mate face, then go to Step 3.
Step 4.3. Else, go to Step 5.
Step 5. (Stitching topology)
Step 5.1. Stitch topology information between all mate faces and $e^\beta_{pop}$.
Step 6. (Stack update)
Step 6.1. For each mate face, get the two edges $e^\beta_1$ and $e^\beta_2$ (except $e^\beta_{pop}$) on the mate face.
Step 6.2. If $e^\beta_1$ or $e^\beta_2$ already exists in T as $e^\beta_j$, then update the partial topologies of the existing edge, either $e^\beta_1$ or $e^\beta_2$, using $e^\beta_j$ and delete $e^\beta_j$ from the stack T.
Step 6.3. Else, put the edges (other than $e^\beta_{pop}$) into stack T.
Step 6.4. Go to Step 3.
Step 7. (Termination)
Step 7.1. Terminate.

Hereinafter, a method of recognizing pockets on a protein using the beta-shape, which is in accordance with a sixth preferred embodiment of the present invention, will be described.

Given a protein, the method first obtains beta-shapes of Van Der Waals atoms. In a specific example, the method may first obtain a Voronoi diagram of Van Der Waals atoms. Then, it may compute the beta-shapes from the Voronoi diagram using a spherical probe.

The first step in defining a pocket is to define the spatial proximity among the atoms on the surface of the protein. This is done by using a beta-shape. Then, pocket primitives are defined on the beta-shape, wherein a pocket primitive is a unit of depressed region on the beta-shape. Lastly, the validity of boundaries between neighboring pocket primitives are evaluated to test if two neighbors should be considered as being from a single pocket or not. Eventually, a few pockets will be left on the surface of a receptor, wherein each pocket corresponds to an appropriately depressed region.

It should be emphasized herein once again that the beta-shape takes the size variations of atoms into account when computing the proximity among atoms on the surface of a protein. As mentioned above, the radius difference between atoms (e.g., H and P) is quite significant.

Figure 34:
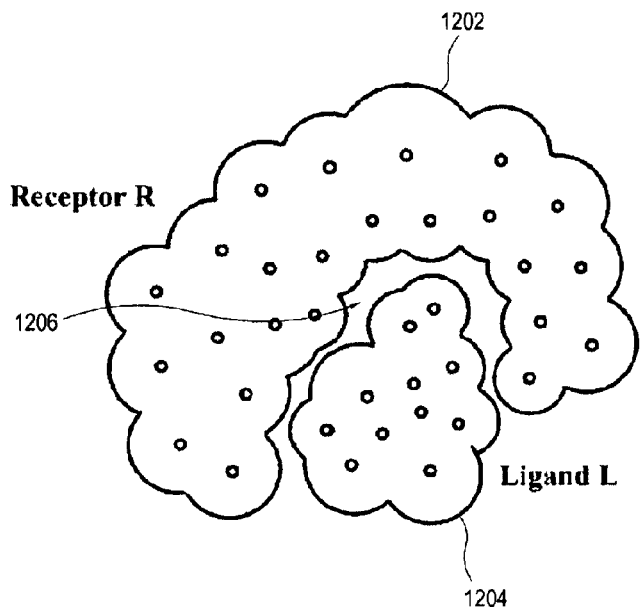
FIG. 34 shows two molecules, a receptor and a ligand, which interact with each other via a pocket.

FIG. 34 shows two molecules, namely, a receptor R 1202 and a ligand L 1204, which interact with each other via a pocket 1206 defined on the surface of molecule R 1202. R and L interact with each other since the protruding region of L is geometrically inserted into the pocket on the surface of R.

Assume $A=\{a_1, a_2, \ldots, a_n\}$ is a protein consisting of atoms $a_i=(c_i, r_i)$ where $c_i=\{x_i, y_i, z_i\}$ and $r_i$ is the center and the radius of the atom $a_i$, respectively. In addition, assume that $L=\{l_1, l_2, \ldots, l_m\}$ is a ligand which also consists of a number of atoms $l_j$ (defined similarly to $a_i$), and L will be docking with A. Further assume that $C=\{c_1, c_2, \ldots, c_n\}$ is the set of centers of atoms. Note that in general m<<n. Assume $p=(c_p, r_p)$ (called a probe) is the minimum sphere enclosing all atoms in the ligand L.

Assume $\pi_j$ is a pocket wherein $\pi_j=\{a_{j1}, a_{j2}, \ldots, a_{jk}\}$, in which these atoms together define a depressed region on the surface S of protein A. The surface $S=\{s_1, s_2, \ldots, s_l\}$ is defined as a set of atoms of the protein, wherein some points on the surface of the atoms contribute to the molecular surface. Hence, S is a set of atoms $a_i \in A$ which may be touched by the ligand. Since $\pi_j \subseteq S \subseteq A$ and $\pi_1 \cap \pi_2 \cap \ldots \cap \pi_p \subseteq S \subseteq A$, there may be some atoms that are not included in any pocket. Assume $\Pi=\{\pi_1, \pi_2, \ldots, \pi_p\}$ is the set of all possible pockets on S.

Since $\pi_j \subseteq S$, extracting pockets need to query on the surface shape of the protein. Hence, an appropriate definition of the surface of a protein and the efficient representation of the topological structure among atoms on the surface is necessary. In this regard, the beta-shape based on the Voronoi diagram of spheres is employed.

Assume that $p_L$ and $p_\infty$ are a probe for a ligand L and a hypothetical probe with infinite radius, respectively. Further assume that $B_L$ and $B_\infty$ are the beta-shapes of a protein corresponding to $p_L$ and $p_\infty$, respectively. Then, $B_\infty$ is a beta-shape bounded by faces defined by the centers of atoms with unbounded Voronoi regions. Unlike an alpha-shape, however, a beta-shape $B_\infty$ may contain some isolated vertices.

Let $B_I$ and $B_O$ denote $B_L$ and $B_\infty$ to specify the inner and outer beta-shapes of a given model, respectively. Assume that $B_I=\{V^B_I, E^B_I, F^B_I\}$ and $B_O=\{V^B_O, E^B_O, F^B_O\}$. Let $V^B_O=\{V^O_1, V^O_2, \ldots\}$. $E^B_O, F^B_O, V^B_I, E^B_I,$ and $F^B_I$ are similarly defined.

Figure 35:
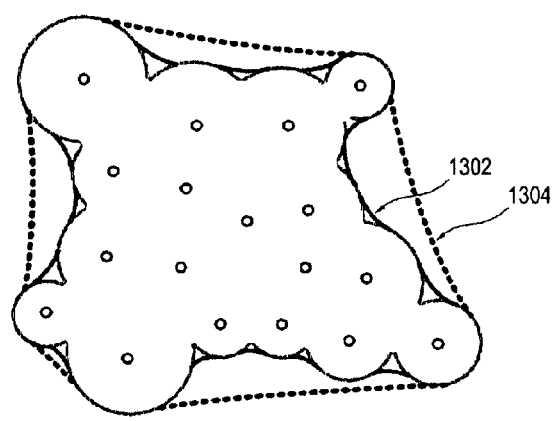
FIGS. 35 and 36 show inner and outer beta-shapes in 2D.
Figure 36:
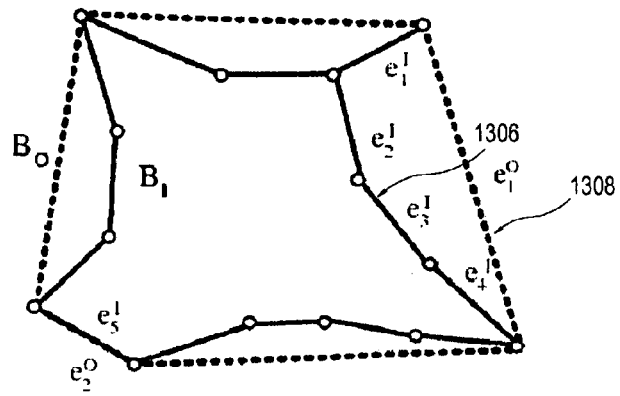

FIGS. 35 and 36 show a 2D analogy for the inner and outer beta-shapes of a protein. In FIG. 35, the solid line 1302 and dotted line 1304 represent the inner and outer molecular surfaces, respectively. Further, FIG. 36 shows corresponding inner and outer beta-shape 1306 and 1308. From this figure, we can make a simple observation, as follows: for each edge of $B_O$, there is zero or one depression on $B_I$ of the protein. For example, in FIG. 36, an edge $e^O_I$ of $B_O$ corresponds to a depressed region formed by edges $e^I_1, e^I_2, e^I_3$ and $e^I_4$. When an edge of $B_O$ corresponds to a depression, the depression can be regarded as a pocket. Obviously, no pocket is defined when an edge on $B_O$ coincides with one of inner beta-shape, shown as $e^I_5$ and $e^O_2$ in the figure.

Similar observation can be made for its 3D counterpart. For a face $f^O \in F^B_O$ of a 3D protein, there is a corresponding depressed region on $B_I$ unless $f^O$ coincides with a face $f^I \in F^B_I$.

However, a pocket on $B_I$ may or may not correspond to a face $f^O \in F^B_O$. A large pocket, for example, may correspond to two faces of $B_O$ in $F^B_O$ when the depressed regions from two faces of $B_O$ do not have a clear boundary between them. In such a case, a depressed region on $B_I$ corresponding to a face $f^O \in F^B_O$ cannot be defined to form a complete pocket. Instead, both depressed regions may altogether define a single pocket. Hence, the concept of pocket primitive pas a unit depressed region on $B_I$ corresponding to each face $f^O \in F^B_O$ will be described.

A face $f^O_i \in F^B_O$ has three associated vertices $v^O_{i1}, v^O_{i2}$, and $v^O_{i3}$ in $V^B_O$. There are always three vertices $v^I_{i1}, v^I_{i2}$ and $v^I_{i3}$ in $V^B_I$, which coincide with $V^O_{i1}, V^O_{i2}$ and $V^O_{i3}$, respectively. Let $\gamma_{(i1, i2)}$ be geodesic (i.e., shortest path), on the inner beta-shape $B_I$ between $v^I_{i1}$ and $v^I_{i2}$. The path from a vertex follows an incident edge and the distance between two neighboring vertices is defined as the edge length between the two vertices. Hence, the distance between two arbitrary vertices is the sum of the edge lengths along the shortest path connecting two vertices. Geodesic $\gamma_{(i1, i2)}$ is referred to as a ridge between two pocket primitives.

The geometric meaning of $\gamma_{(i1, i2)}$ is as follows. While the extreme vertices $v^I_{i1}$ and $v^{II}_{i2}$ are on both $B_O$ and $B_I$, the other vertices on the path define depressions on $B_I$ from the corresponding face of $B_O$. Hence, the geodesic $\gamma_{(i1,i2)}$ can be interpreted as the most upward wall separating two relatively deep depressions on $B_I$. Other geodesics $\gamma_{(i2, i3)}$ and $\gamma_{(i3, i1)}$ can be similarly interpreted.

Assume that $F_{sub\ i}^I$ is a set of faces $f^I_h$, wherein $f^I_h \in F^B_I$ is interior to the three geodesics $\gamma_{(i1, i2)}, \gamma_{(i2, i3)}$ and $\gamma_{(i3, i1)}$. Then, $F_{sub\ i}^I$ forms a topologically triangular shaped depression on $B_I$ from the corresponding face of $B_O$. This depression is referred to as a pocket primitive $f_i$ corresponding to a face $f^O_i \in F^B_O$ and is also represented by another graph $\phi_i = (V_{sub\ i}^I, E_{sub\ i}^I, F_{sub\ i}^I)$.

Figure 37:
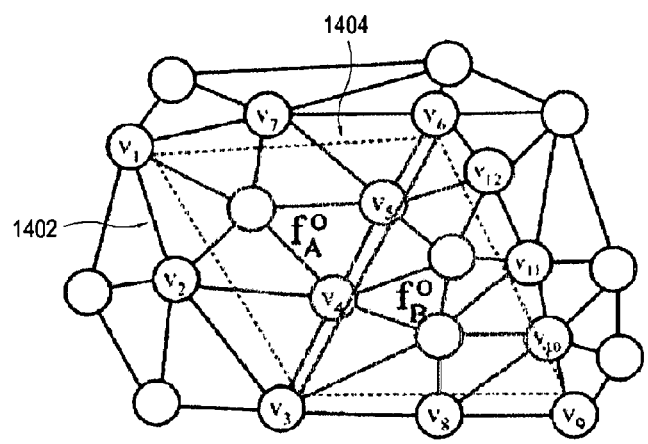
FIGS. 37 and 38 show an example of pocket primitives.
Figure 38:
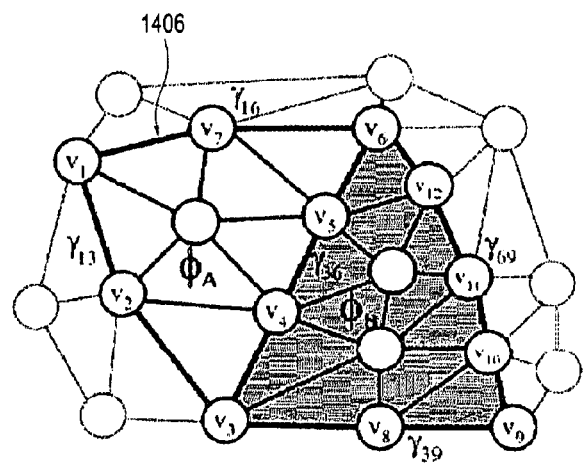

In FIG. 37, $B_I$ is shown as a mesh of solid lines 1402 and $B_O$ is shown as two large triangles $f^O_A$ and $f^O_B$ bounded by broken lines 1404. Four geodesics on $B_I$ corresponding to the four edges 1404 on $B_O$ are shown in FIG. 38 as thick lines 1406. Inside the four paths 1406, there are two corresponding pocket primitives $\phi_A$ and $\phi_B$.

When a face $f^O_i \in F^B_O$ coincides with a face $\phi^I_i \in F^B_I$, $F_{sub\ i}^I$ consists of a single face $\phi^I_i \in F^B_I$ and it is not considered as a pocket primitive. Note that $F_{sub\ i}^I$ can even be a null set when three geodesics degenerate to three curve segments without containing any face inside. In such a case, no pocket primitive corresponds to the face. Based on the above, a few properties can be obtained:

If $\phi_i$ and $\phi_j$ are not topological neighbors, then $F_{sub\ i}^I \cap F_{sub\ j}^I = \emptyset$ where $i \neq j$. Further, if $\phi_i$ and $\phi_j$ are topological neighbors, then $E_{sub\ i}^I \cap E_{sub\ j}^I = \gamma_{(ij)} \neq 0$. The geodesic $\gamma_{(ij)}$ is referred to as a ridge between $\phi_i$ and $\phi_j$.

Figure 39:
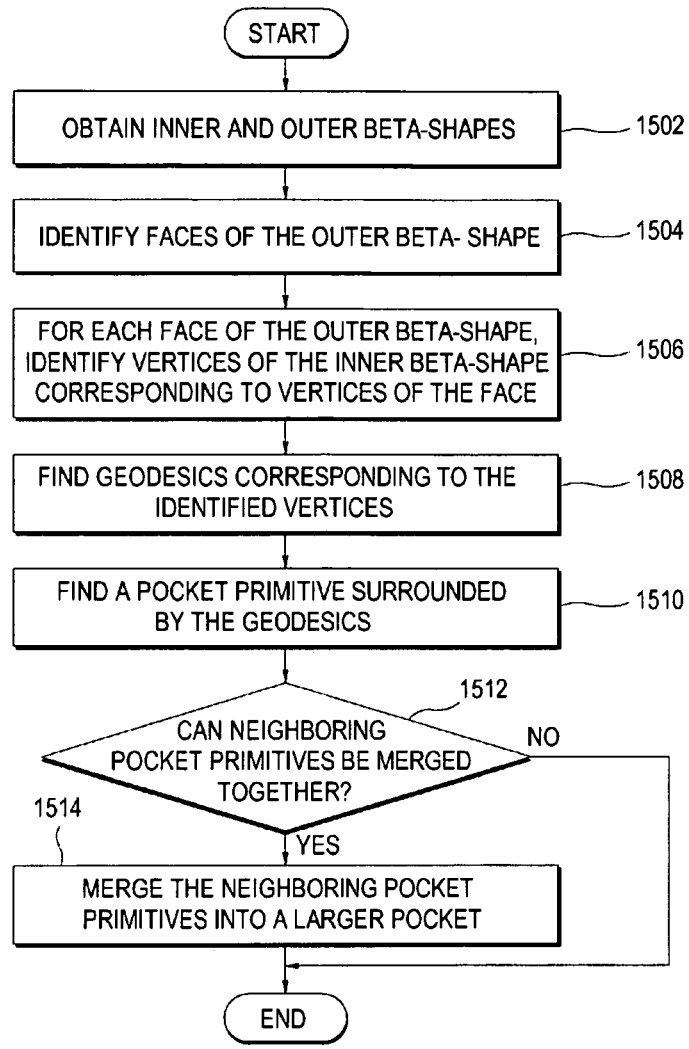
FIG. 39 describes a method of recognizing pockets on a protein using the beta-shape in accordance with a seventh preferred embodiment of the present invention.

Next, the method of the present embodiment will be described in more detail with reference to FIG. 39.

First, pocket primitives are extracted from $B_O$. In step 1502, it obtains inner beta-shape $B_I$ and outer beta-shape $B_O$.

In one example, the method may first obtain a Voronoi diagram of spheres for the atom set, and then compute the inner and outer beta-shapes from the Voronoi diagram of spheres. It then identifies faces $f^O_i$ of the outer beta-shapes $B_O$ in step 1504, and then identifies three vertices $v_{i1}$, $v_{i2}$, and $v_{i3}$ of the inner beta-shape $B_I$ corresponding to the vertices of $f^O_i$ in step 1506. Next, the geodesics $\gamma_{(i1, i2)}$, $\gamma_{(i2, i3)}$ and $\gamma_{(i3, i1)}$ corresponding to the three identified vertices $v_{i1}$, $v_{i2}$ and $v_{i3}$ are found in step 1508. Thus, a pocket primitive $\phi_i = (V^I_{sub\ i}, E^I_{sub\ i}, F^I_{sub\ i})$ surrounded by the geodesics $\gamma_{(i1, i2)}$, $\gamma_{(i2, i3)}$ and $\gamma_{(i3, i1)}$ can be found in step 1510.

Given the pocket primitives, one or more neighboring pocket primitives may form a pocket. Hence, it needs to be determined whether two neighboring pocket primitives can be merged together to form a more meaningful depression based on an appropriate criterion in step 1512. As mentioned above, a ridge $\gamma_{(i1, i2)}$ exists between two incident pocket primitives $\phi_i$ and $\phi_j$. It is also an edge chain on $B_I$ corresponding to the geodesic between two extreme vertices of a pocket primitive. Hence, a ridge plays the role of the boundary between two incident pocket primitives.

Assume that a mountain is the edge chain on $B_I$ separating two pockets. If a ridge is sufficiently high, then can be regarded as a mountain. Note that a pocket primitive always has 3 ridges and a pocket is surrounded by 3 or more mountains. Therefore, the boundary of a pocket primitive may or may not be the boundary of a pocket.

Assume that a path $\gamma_k$, which is a ridge, exists between two incident pocket primitives $\phi_i$ and $\phi_j$ corresponding to an edge $e^O_k$ of $E^B_O$. Note that there always exists a geodesic on $B_I$ for an edge of $B_O$. Then, a certain measure can be defined to determine the discrepancy between two chains, $e^O_k$ and $\phi_k$. Depending on the measure and its prescribed threshold value, two pocket primitives sharing the chain can be merged into one larger pocket in step 1514.

There are various ways to define such a measure for the merge. For an example, the concept of average distance between two chains may be employed. Let $\delta_k$ be the average distance between $e^O_k$ and $\phi_k$. If $\delta_k$ is larger than a prescribed value, then the two neighboring pocket primitives sharing the chains can be merged. Otherwise, $\phi_k$ can be regarded as a mountain chain. For such threshold value in this embodiment, the average of all $\delta$ values may be chosen, without being limited thereto. After all, atoms for vertices in merged pocket primitives define the pocket $\pi_k$. Note that there may be various other measures, which can be used for merging the pocket primitives, and these measures can be easily computed once they are well defined. The internal angles at the edges of a ridge, the intrinsic shape of a pocket primitive, etc. can constitute such examples.

Once pockets are recognized, it is often necessary to evaluate the significance of the pockets. In other words, some recognized pockets may not be regarded as significant pockets. There are different criteria for such evaluation (e.g., the average or maximum depth of pocket from the entrance of the pocket, the volume of the pocket from the entrance, etc.). Note that these can be also easily computed.

$B_O$ can also be defined by a probe p with a radius $r_p << \infty$. Then, the resulting pockets from such $B_O$ is in a finer grain than those from $B_\infty$. Often, the pockets extracted from such finer grain $B_O$ can be more meaningful.

Figure 40:
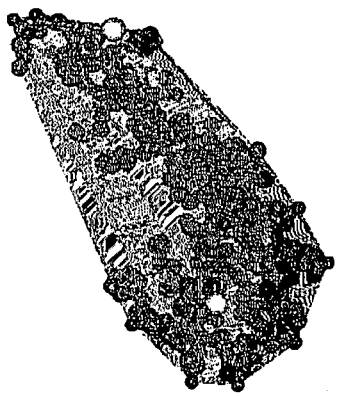
FIGS. 40 to 45 describe the process of the pocket recognition.
Figure 41:
Figure 42:
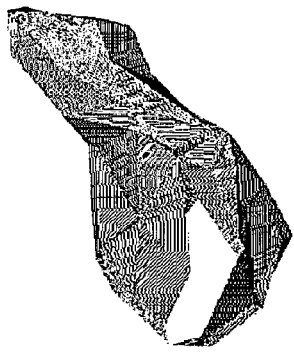
Figure 43:
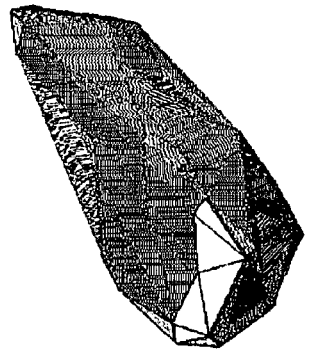

FIGS. 40 to 45 visualize the process of the pocket recognition from a protein model. After computing the Euclidean Voronoi diagram of the protein, $B_O$ of the protein is computed as shown in FIG. 40. FIG. 41 shows the molecular surface of the protein after blending by using a predefined probe. FIG. 42 shows the beta-shape. Then, the pocket primitive corresponding to each face of $B_O$ is shown in FIG. 43. In this example, an outer beta-shape $B_O = B_\infty$ and an inner beta-shape $B_I$ are obtained by blending the protein with a probe of radius 8 Å. In this figure, some of the faces on $B_I$ coinciding with the faces on $B_O$ do not contribute to any pocket primitives.

Figure 44:
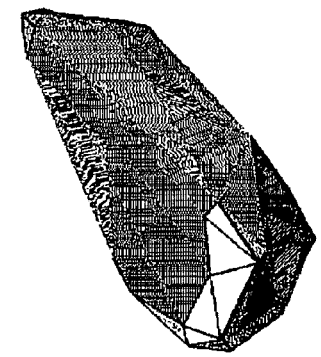
Figure 45:
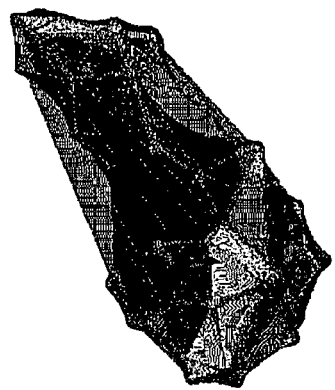

After pocket primitives are properly extracted, the ridges around all pocket primitives can be evaluated, wherein the appropriate pocket primitive pairs can be merged, if necessary, to form pockets. FIGS. 44 and 45 show the beta-shape $B_I$ and the corresponding blended molecular surface of the largest pocket recognized on the protein.

In the above, a method has been presented to automatically recognize the pockets on the surface of proteins. In this method, a Euclidean Voronoi diagram of atoms is first computed and beta-shapes corresponding to given probes from the Voronoi diagram is constructed. Two beta-shapes can be computed, namely, one for inner definition and the other for outer definition of surface atom sets. Then, the pocket primitives on the inner beta-shape, which corresponds to each face of the outer beta-shape, can be computed. After extracting the pocket primitives, the quality of boundaries between neighboring pocket primitives can be evaluated to test if two neighbors should be merged into a single pocket or not. Eventually, a few pockets remain on the surface of a receptor, wherein each pocket corresponds to an appropriately depressed region.

Although this preferred embodiment illustrates the present invention in the context of a biological field, the present invention can be also applied in various other field (e.g., science and engineering fields). For example, the present invention can be applied in the fields of physics, chemistry, astronomy, computer graphics, etc.

Moreover, although the present invention has been mainly illustrated in terms of methods in preferred methods, the present invention can be implemented as computer-readable codes that can be stored in a computer-readable medium, as mentioned above.

The present invention can be also easily practiced as a system by those of an ordinary skill in the art.

The present invention can be applied in various disciplines including science and engineering, and more particularly in biological systems such as proteins without being limited thereto.

While the present invention has been shown and described with respect to preferred embodiments, those skilled in the art will recognize that various changes and modifications may be made without departing from the spirit and scope of the invention as defined in the appended claims.

The invention claimed is:

1. A non-transitory computer-readable medium, comprising:
   computer-readable code adapted to obtain a Voronoi diagram object of spheres;
   computer-readable code adapted to search for partially accessible Voronoi edges from the Voronoi diagram object; and
   computer-readable code adapted to compute faces of a beta-shape object from the partially accessible Voronoi edges.

2. The non-transitory computer-readable medium of claim 1, further comprising:
   computer-readable code adapted to search for partially accessible Voronoi faces from the Voronoi diagram object; and
   computer-readable code adapted to compute edges of the beta-shape object from the partially accessible Voronoi faces.

3. The non-transitory computer-readable medium of claim 1, wherein the computer-readable code adapted to search for partially accessible Voronoi edges from the Voronoi diagram object includes:
  computer-readable code adapted to check the edges in the Voronoi diagram object in a brute force way.

4. The non-transitory computer-readable medium of claim 1, wherein the computer-readable code adapted to search for partially accessible Voronoi edges from the Voronoi diagram object includes:
  (a) computer-readable code adapted to collect infinite edges in the Voronoi diagram object;
  (b) computer-readable code adapted to determine whether each of the collected edges is partially accessible;
  (c) computer-readable code adapted to, if it is determined that each of the collected edges is not partially accessible, further collect edges incident to each of the collected edges; and
  (d) computer-readable code adapted to repeat the computer-readable codes (b) and (c) while there is at least one collected edge.

5. The non-transitory computer-readable medium of claim 4, wherein the computer-readable code (c) includes:
  computer-readable code adapted to determine whether the incident edges are already collected; and
  computer-readable code adapted to, if it is determined that the incident edges are not collected, further collect the incident edges.

6. The non-transitory computer-readable medium of claim 1, further comprising:
  computer-readable code adapted to collect vertices of the faces of the beta-shape object;
  computer-readable code adapted to, for each of Voronoi faces incident to the vertices, determine whether a spine curve of a rolling blend corresponding to each of the Voronoi faces is a complete circle; and
  computer-readable code adapted to, if it is determined that the spine curve is a complete circle, determine each of the Voronoi faces to correspond to a dangling edge of the beta-shape object.

7. The non-transitory computer-readable medium of claim 1, wherein the computer-readable code adapted to search for partially accessible Voronoi edges from the Voronoi diagram object includes:
  computer-readable code adapted to find one partially accessible edge from an infinite Voronoi edge by a depth-first search; and
  wherein the computer-readable code adapted to compute faces of the beta-shape object from the partially accessible Voronoi edges includes:
  computer-readable code adapted to construct a face of the beta-shape object corresponding to the partially accessible edge;
  computer-readable code adapted to collect edges of the face; and
  computer-readable code adapted to search for mate faces sharing an edge of the edges.

8. The non-transitory computer-readable medium of claim 7, wherein the computer-readable code adapted to compute faces of the beta-shape object from the partially accessible Voronoi edges further includes:
  computer-readable code adapted to, if there is one or more mate faces, stitch topology information between the mate faces and the shared edge;
  computer-readable code adapted to obtain edges of each of the mate faces except the shared edge;
  computer-readable code adapted to determine whether each of the obtained edges is already collected; and
  computer-readable code adapted to, if it is determined that each of the obtained edges is not collected, further collect each of the obtained edges.

9. A system comprising:
  a computer; and
  a non-transitory computer-readable medium that stores logic executable by the computer;
  the logic configured to obtain a Voronoi diagram object of spheres;
  search for partially accessible Voronoi edges from the Voronoi diagram object; and
  compute faces of a beta-shape object from the partially accessible Voronoi edges.

10. The system of claim 9, further comprising:
  logic configured to search for partially accessible Voronoi faces from the Voronoi diagram object; and
  logic configured to compute edges of the beta-shape object from the partially accessible Voronoi faces.

11. The system of claim 9, wherein the logic configured to search for partially accessible Voronoi edges from the Voronoi diagram object includes:
  logic configured to check the edges in the Voronoi diagram object in a brute force way.

12. The system of claim 9, wherein the logic configured to search for partially accessible Voronoi edges from the Voronoi diagram object includes:
  (a) logic configured to collect infinite edges in the Voronoi diagram object;
  (b) logic configured to determine whether each of the collected edges is partially accessible;
  (c) logic configured to, if it is determined that each of the collected edges is not partially accessible, further collect edges incident to each of the collected edges; and
  (d) logic configured to repeat the computer-readable codes (b) and (c) while there is at least one collected edge.

13. The system of claim 12, wherein the computer-readable code (c) includes:
  logic configured to determine whether the incident edges are already collected; and
  logic configured to, if it is determined that the incident edges are not collected, further collect the incident edges.

14. The system of claim 9, further comprising:
  logic configured to collect vertices of the faces of the beta-shape object;
  logic configured to, for each of Voronoi faces incident to the vertices, determine whether a spine curve of a rolling blend corresponding to each of the Voronoi faces is a complete circle; and
  logic configured to, if it is determined that the spine curve is a complete circle, determine each of the Voronoi faces to correspond to a dangling edge of the beta-shape object.

15. The system of claim 9, wherein the logic configured to search for partially accessible Voronoi edges from the Voronoi diagram object includes:
  logic configured to find one partially accessible edge from an infinite Voronoi edge by a depth-first search; and
  wherein the logic configured to compute faces of the beta-shape object from the partially accessible Voronoi edges includes:
  logic configured to construct a face of the beta-shape object corresponding to the partially accessible edge;
  logic configured to collect edges of the face; and logic configured to search for mate faces sharing an edge of the edges.

16. The system of claim 15, wherein the logic configured to compute faces of the beta-shape object from the partially accessible Voronoi edges further includes:
   logic configured to, if there is one or more mate faces, stitch topology information between the mate faces and the shared edge;
   logic configured to obtain edges of each of the mate faces except the shared edge;
   logic configured to determine whether each of the obtained edges is already collected; and
   logic configured to, if it is determined that each of the obtained edges is not collected, further collect each of the obtained edges.

17. A method for constructing a beta-shape, comprising:
   acquiring a Voronoi diagram of spheres;
   searching for partially accessible Voronoi edges; and
   obtaining faces of the beta-shape from the partially accessible Voronoi edges.

18. The method of claim 17, further comprising:
   searching for partially accessible Voronoi faces; and
   obtaining edges of the beta-shape from the partially accessible Voronoi faces.

19. The method of claim 17, wherein the step of searching includes:
   checking the edges in the Voronoi diagram in a brute force way.

20. The method of claim 17, wherein the step of searching includes:
   (a) collecting infinite edges in the Voronoi diagram;
   (b) determining whether each of the collected edges is partially accessible;
   (c) if it is determined that each of the collected edges is not partially accessible, further collecting edges incident to each of the collected edges; and
   (d) repeating the steps (b) and (c) while there is at least one collected edge.

21. The method of claim 20, wherein the step (c) includes:
   determining whether the incident edges are already collected; and
   if it is determined that the incident edges are not collected, further collecting the incident edges.

22. The method of claim 17, further comprising:
   collecting Vertices of the faces of the beta-shape;
   for each of Voronoi faces incident to the vertices, determining whether a spine curve of a rolling blend corresponding to each of the Voronoi faces is a complete circle; and
   if it is determined that the spine curve is a complete circle, determining each of the Voronoi faces to correspond to a dangling edge of the beta-shape.

23. The method of claim 17, wherein the step of searching includes:
   finding one partially accessible edge from an infinite Voronoi edge by a depth-first search, and
   wherein the step of obtaining includes:
   constructing a face of the beta-shape corresponding to the partially accessible edge;
   collecting edges of the face; and
   searching for mate faces sharing an edge of the edges.

24. The method of claim 23, wherein the step of obtaining further includes:
   if there is one or more mate faces, stitching topology information between the mate faces and the shared edge;
   obtaining edges of each of the mate faces except the shared edge;
   determining whether each of the obtained edges is already collected; and
   if it is determined that each of the obtained edges is not collected, further collecting each of the obtained edges.

* * * * *